US012333656B1

(12) United States Patent
Romero, Jr. et al.

(10) Patent No.: US 12,333,656 B1
(45) Date of Patent: Jun. 17, 2025

(54) SYSTEMS AND METHODS FOR PROVIDING REAL-TIME FEEDBACK BASED ON OPERATIONAL DATA

(71) Applicant: United Services Automobile Association (USAA), San Antonio, TX (US)

(72) Inventors: Jose L. Romero, Jr., San Antonio, TX (US); Andre Rene Buentello, San Antonio, TX (US); Matthew Robert Byrd, Boerne, TX (US); Mounica Urity, San Antonio, TX (US); Sayeef Rahim, Allen, TX (US); Timothy Blair Chalmers, San Antonio, TX (US); Robert Lee Black, San Antonio, TX (US); Ashley Raine Philbrick, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 154 days.

(21) Appl. No.: 17/955,142

(22) Filed: Sep. 28, 2022

Related U.S. Application Data

(60) Provisional application No. 63/250,566, filed on Sep. 30, 2021.

(51) Int. Cl.
*G06T 19/00* (2011.01)
*G06T 7/70* (2017.01)

(52) U.S. Cl.
CPC .............. *G06T 19/006* (2013.01); *G06T 7/70* (2017.01); *G06T 19/003* (2013.01); *G06T 2207/30268* (2013.01)

(58) Field of Classification Search
None
See application file for complete search history.

(56) References Cited

U.S. PATENT DOCUMENTS

| 9,135,759 B2 * | 9/2015 | Baer | G01C 21/3469 |
| 2004/0124974 A1 * | 7/2004 | Ota | B60R 22/48 340/457.1 |
| 2021/0339770 A1 * | 11/2021 | Tamori | B60W 30/143 |
| 2021/0356289 A1 * | 11/2021 | Horihata | G01C 21/3644 |
| 2021/0403042 A1 * | 12/2021 | Jaegal | B60W 50/14 |
| 2022/0126864 A1 * | 4/2022 | Moustafa | G08G 1/096783 |

* cited by examiner

*Primary Examiner* — Steven Z Elbinger
(74) *Attorney, Agent, or Firm* — Fletcher Yoder P.C.

(57) ABSTRACT

A method may include receiving, by a software application that may execute on a mobile device associated with an individual operating a vehicle, operational data associated with operation of the vehicle. The method may also include predicting, by the software application, one or more activities that the individual is expected to perform with respect to operation of the vehicle based at least in part on the operational data, and providing, by the software application via the mobile device, an indication of a recommendation to perform the one or more activities.

15 Claims, 8 Drawing Sheets

SYSTEMS AND METHODS FOR PROVIDING REAL-TIME FEEDBACK BASED ON OPERATIONAL DATA

CROSS-REFERENCE TO RELATED APPLICATIONS

This application claims priority to and benefit of Provisional Application No. 63/250,566, entitled "SYSTEMS AND METHODS FOR PROVIDING REAL-TIME FEEDBACK BASED ON OPERATIONAL DATA", and filed on Sep. 30, 2021, which is hereby incorporated by reference in its entirety for all purposes.

BACKGROUND

The present disclosure relates generally to promoting improved operation of a vehicle. More specifically, the present disclosure relates to analyzing operational data associated with an individual's operation of a vehicle to provide constructive feedback to the individual, providing one or more educational or gaming experiences to a user based on the operational data, providing an incentive-based system for promoting improvements in an individual's operation of a vehicle, or a combination thereof.

New or inexperienced drivers may learn various driving techniques through instructional videos or in-person lessons. For instance, during a driver's educational course, an instructor may demonstrate performance of certain vehicle maneuvers for an individual to learn or the individual may practice such maneuvers via a driving simulator. Additionally, the individual may receive feedback from the instructor based on the individual's performance of these maneuvers during the driver's educational course. However, once the individual begins to drive a vehicle without assistance from the instructor, the individual may not continue to receive constructive feedback based on the individual's operation of the vehicle. Thus, the individual's ability in operating the vehicle may stagnate or not improve over time. Accordingly, it may be beneficial to provide various techniques that promote the improvement of an individual's performance in operating a vehicle.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a mobile device that includes one or more processors and a memory accessible by the processors. The memory may store instructions that, when executed by the processors, cause the processors to perform operations. The operations include receiving operational data associated with usage of a vehicle operated by and individual, identifying an activity that the individual is expected to perform with respect to the usage of the vehicle operated by the individual, determining whether the individual performed the activity based on the operational data, and providing an indication that the individual performed the activity in response to determining that the individual performed the activity.

In another embodiment, a method may include receiving, by a software application that may execute on a mobile device associated with an individual operating a vehicle, operational data associated with operation of the vehicle. The method may also include predicting, by the software application, one or more activities that the individual is expected to perform with respect to operation of the vehicle based at least in part on the operational data, and providing, by the software application via the mobile device, an indication of a recommendation to perform the one or more activities.

In another embodiment, a non-transitory, computer-readable medium includes instructions that when executed by one or more processors, cause the processors to perform operations. The operations include receiving user input indicative of one or more customizations associated with a simulated driving experience in a virtual reality, an augmented reality, or a mixed reality (VR/AR/MR) environment and transmitting a request for operational data associated with the one or more customizations to a monitoring system. The operations also include receiving the operational data associated with the one or more customizations from the monitoring system, generating the simulated driving experience in the VR/AR/MR environment based at least in part on the operational data associated with the one or more customizations, and providing, via a display device, one or more visualizations associated with the simulated driving experience in the VR/AR/MR environment.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

Figure 7:
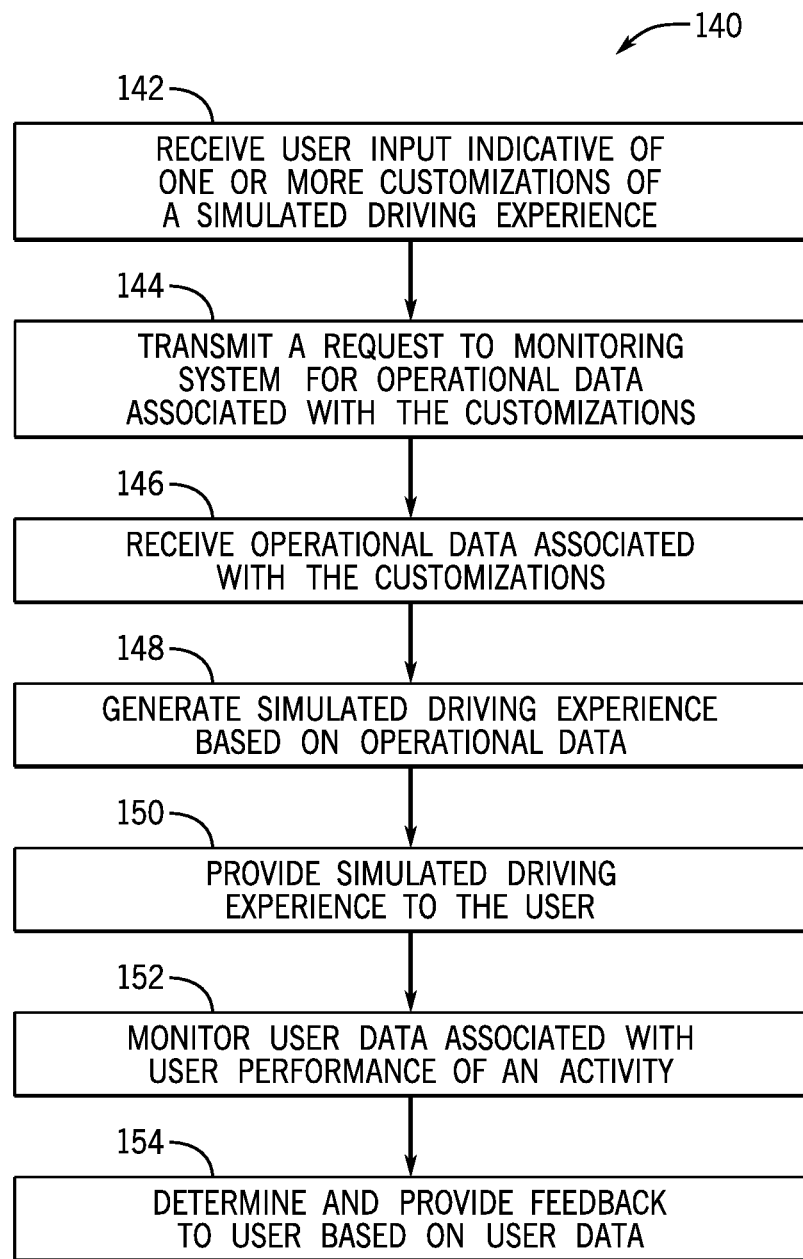
Figure 8:
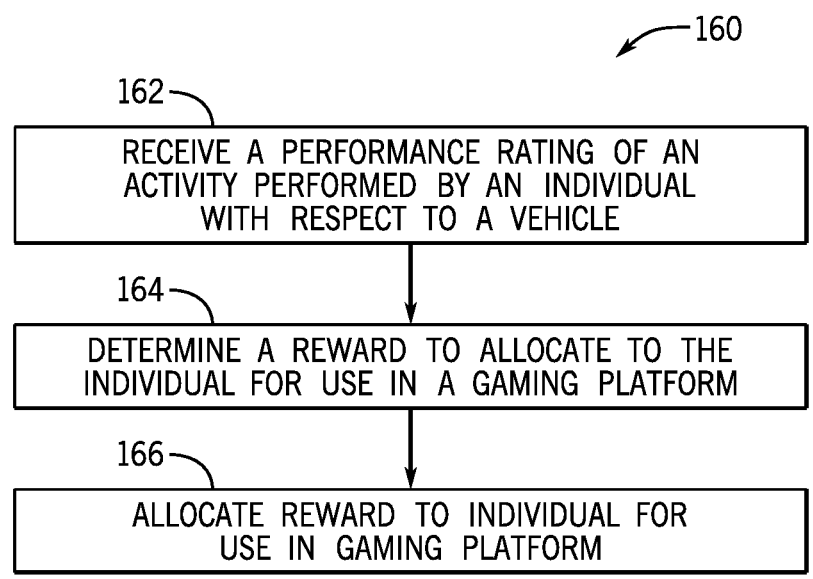

FIG. 7 illustrates a flow chart of a method for providing a simulated driving experience to a user based on operational data associated with one or more real-life driving experiences and providing feedback to the user based on the user's performance of one or more activities with respect to driving a vehicle during the simulated driving experience, in accordance with embodiments described herein; and FIG. 8 illustrates a flow chart of a flow chart of a method for rewarding an individual's performance in operating a vehicle in the real world by allocating rewards to the individual for use in a gaming platform or other software application, in accordance with embodiments described herein,

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As mentioned above, once an individual begins to drive a vehicle without assistance from an instructor, the individual may not receive constructive feedback based on the individual's operation of the vehicle. For example, the individual may not receive a notification that the individual is not using a vehicle's turn signals to indicate that the individual is performing a turn or switching lanes on a roadway, the individual is not using the vehicle's seatbelt, the individual is not looking at the road because the individual is attending to the individual's mobile device, or the like. Thus, the individual's ability in operating the vehicle may stagnate and/or not improve over time.

Accordingly, provided herein are techniques directed to improving an individual's performance in operating a vehicle or promoting the improvement thereof. In certain embodiments, a software application may be installed on an individual's mobile device that receives operational data associated with the individual's operation of the vehicle and analyzes the operational data to provide real-time feedback to the individual. For example, the operational data may include data from one or more sensors on or within the vehicle, data from the individual's mobile device, or the like. Additionally, the feedback may be provided to the individual via the individual's mobile device, a display device of the vehicle, a speaker of the vehicle, or a combination thereof.

In certain embodiments, the software application may analyze the operational data to determine whether the individual has successfully performed one or more activities associated with the individual's use of the vehicle. The individual's use of the vehicle may include a time period before the individual begins to operate the vehicle, a time period in which the individual operates (e.g., drives) the vehicle, a time period after the individual stops operating the vehicle, or a combination thereof. The software application may identify one or more activities that the individual may perform during the individual's use of the vehicle. For instance, such activities may include one or more safety tasks (e.g., using a seatbelt, using turn signals, or using an emergency brake) or one or more driving maneuvers (e.g., merging onto a highway or traversing a roundabout). The mobile application may select one or more of the identified activities and monitor operational data received from the vehicle, the individual's mobile device, or both, to determine whether the individual has performed the selected activities. In response to determining that the individual has successfully performed a particular activity, the software application may provide an indication that the individual has successfully performed the activity via the mobile device, the vehicle, or both. Alternatively, if the monitoring system determines that the individual has not performed a particular activity, the monitoring system may send provide an indication that the individual has not performed the activity via the mobile device, the vehicle, or both. In this way, the monitoring system may encourage the individual to stay alert and focused during the individual's use of the vehicle.

Alternatively, in certain embodiments, the software application may analyze the operational data to predict one or more activities that the individual may perform when using the vehicle along a particular route based on the operational data. After predicting the activities, the software application may prompt the individual to perform one or more of the activities via the mobile device or the vehicle. For instance, if the software application determines that the individual should merge onto a highway during a portion of the particular route, the software application may prompt the individual to merge onto the highway a suitable time or distance before the individual reaches the portion of the particular route. That is, the software application may guide or prompt the individual to perform one or more activities a suitable amount of time before the individual would be expected to perform the activities along the route. In this way, the software application may notify the individual of future activities that may be performed by the individual along the route. In some embodiments, the software application may receive additional operational data during a time period in which the individual is expected to perform the activity and analyze the additional operational data to automatically provide feedback to the individual. For instance, the software application may determine a performance rating associated with the individual's performance of the activity and provide constructive feedback that may help the individual improve future performance of the activity.

Additionally, a monitoring system may be communicatively coupled to the individual's mobile device, the individual's vehicle, other individuals' mobile device, other individuals' vehicles, or a combination thereof. For instance, a group of individuals may register for a service provided by an enterprise associated with the monitoring system. The service may provide each individual with various experiences for promoting improved operation of a vehicle. As part of the service, each individual may share operational data received by each software application on respective individuals' mobile devices within the service to provide improved experiences through the service. For instance, the service may provide real-time feedback to the individual regarding the individual's use of a vehicle or notify the individual of future activities that may be performed by the individual along a particular route as mentioned above. Additionally, the service may provide an educational platform or a gaming platform via an individual's mobile device, a virtual reality, augmented reality, or mixed reality (VR/AR/MR) system, or another computing device.

For example, the educational platform may provide a simulated driving experience based on operational data associated with one or more real-life driving experiences. A user (e.g., an individual) may then practice one or more driving techniques (e.g., defensive driving techniques) during the simulated driving experience via the user's mobile device, the VR/AR/MR system, or another computing device. Based on the user's performance of the driving techniques, the mobile device, the VR/AR/MR system, or another computing device may provide constructive feedback to the user that may help the user improve upon the user's performance. Additionally, the gaming platform may provide a narrative of a game such that a user may embody a role of a character within the narrative. The user may participate in various experiences through the game, which include operating a vehicle. Through the gaming platform, the user may be incentivized to perform various driving techniques to earn rewards or to complete levels within the game. Based in part on the user's performance in operating the vehicle, the user may progress through the game. In certain embodiments, the user's performance in operating the vehicle may earn the user one or more types of rewards that may be used outside the game.

Further, in certain embodiments, the monitoring system may reward an individual's performance in operating a vehicle in the real world by allocating rewards to the individual for use in a gaming platform or other software application. For example, after the software application on an individual's mobile device determines a performance rating of the individual's operation of the vehicle, the software application may transmit data indicative of the performance rating to the monitoring system. The monitoring system may then determine one or more corresponding rewards to allocate to the individual based on the individual's performance rating. For instance, if a gaming platform includes aspects related to driving or racing vehicles, the reward may include a higher quality vehicle, a higher quality part of a vehicle, an allocation of points that the user may use to obtain various items, or the like. In this way, an incentive-based system may be provided to promote improved performance in an individual's operation of the vehicle in the real-world.

Figure 1:
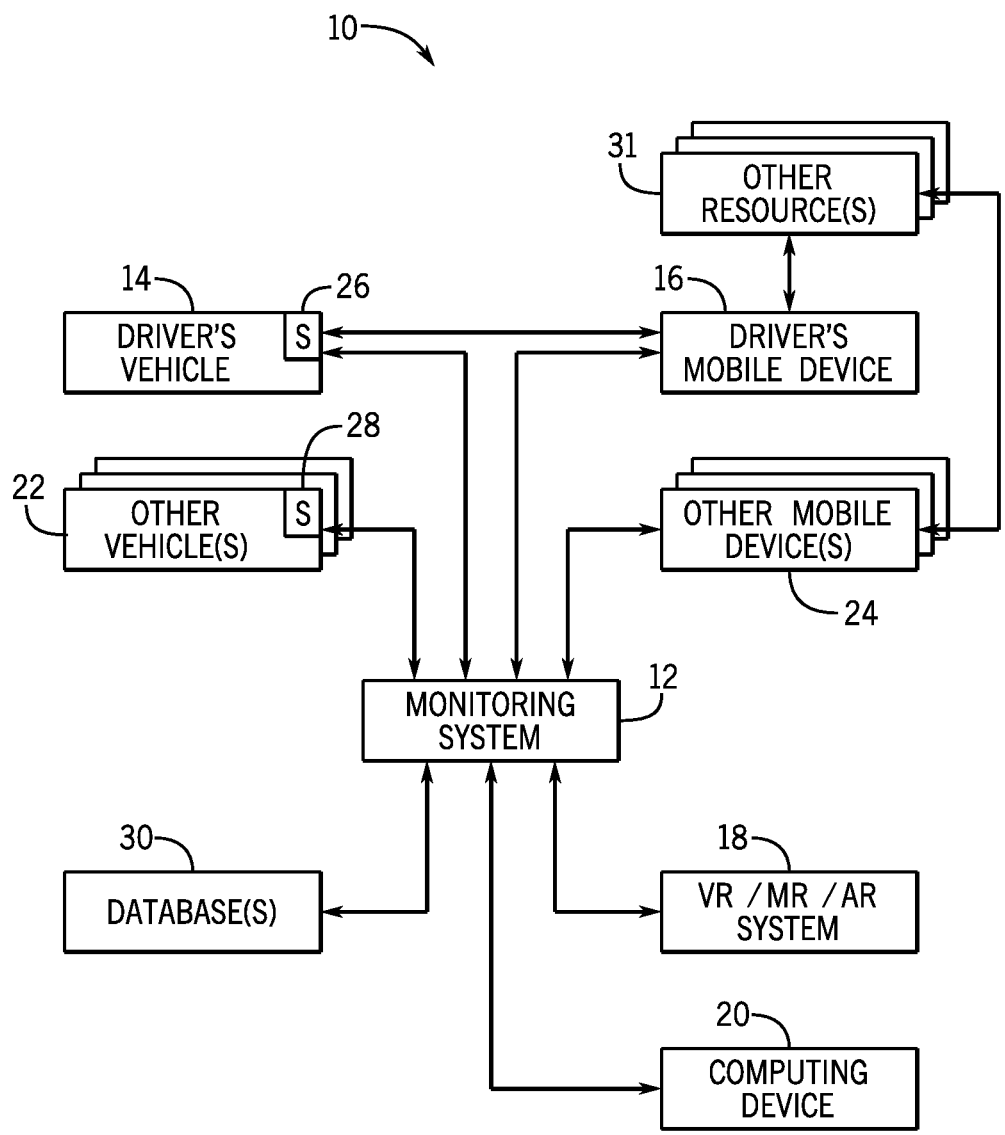
FIG. 1 illustrates a block diagram of a system that includes a system for promoting improved operation of a vehicle by one or more individuals, in accordance with embodiments described herein.

By way of introduction, FIG. 1 illustrates a block diagram of a system 10 that includes a monitoring system 12 that provides one or more services associated with an enterprise. For instance, as mentioned above, the services may provide real-time feedback to an individual regarding the individual's use of a vehicle 14, notify the individual of future activities that may be performed by the individual along a particular route, provide an educational platform or a gaming platform via an individual's mobile device 16, a virtual reality, augmented reality, or mixed reality (VR/AR/MR) system 18, or another computing device 20, or reward an individual's performance in operating a vehicle 14 in the real world by providing rewards to the individual for a gaming platform or other software application.

The monitoring system 12 may receive operational data associated with usage of a vehicle 14, 22 from various sources via a network, the Internet, or the like. For example, the monitoring system 12 may receive operational data from a particular individual's vehicle 14, the particular individual's mobile device 16, one or more other vehicles 22 operated by other individuals within an environment of the vehicle 14 (e.g., within a particular radius of the vehicle 14), one or more other mobile devices 24 associated with other individuals within an environment of the vehicle 14 (e.g., within a particular radius of the vehicle 14), or a combination thereof. As mentioned above, each individual that has registered for a service provided by the monitoring system may share data from a vehicle 14, 22 or a mobile device 16, 24 to the service. The monitoring system 12 and/or each mobile device 16, 24 may include any suitable computing device, such as a general-purpose computer, a mobile computing device, a laptop-computing device, a tablet computing device, a wearable computing device (e.g., a smartwatch), and the like.

Each vehicle 14, 22 may include one or more sensors 26, 28 that monitor various operations associated with the vehicle 14, 22 or various conditions associated with the vehicle 14, 22. For example, the sensors 26, 28 may generate data associated with an acceleration of the vehicle 14, 22, braking or a deceleration of the vehicle 14, 22, a speed of the vehicle 14, 22, swerving of the vehicle 14, 22 (e.g., a pitch of the vehicle 14, 22, a roll of the vehicle 14, 22, and/or a yaw of the vehicle 14, 22), a location of the vehicle 14, 22 (e.g., via a global positioning sensor (GPS)), a turning of the vehicle 14, 22, signaling usage of the vehicle 14, 22, headlight usage of the vehicle 14, 22, windshield wiper usage of the vehicle 14, 22, emergency brake usage of the vehicle 14, 22, radio usage of the vehicle 14, 22, display device usage of the vehicle 14, 22, seatbelt usage of the vehicle 14, 22, or the like. After generating the data, the sensors 26, 28 may transmit the generated data to the monitoring system 12.

The monitoring system 12 may also receive data from each mobile device 16, 24 associated with an individual registered for the services provided by the monitoring system 12. For example, each mobile device 16, 24 may generate audio data or image data associated with an individual's usage of a vehicle 14, 22. The audio data or the image data may be associated with usage of one or more components of the vehicle 14, 22 by the individual, such as a seatbelt, a turn signal, a radio, a speaker, a microphone, or the like, or driving the vehicle 14, 22 itself. Additionally, the image data may also include one or more images or one or more videos of the individual. For example, the mobile device 16, 24 may track the individual's movements within the vehicle 14, 22 or the individual's gaze when using the vehicle 14, 22.

Further, the mobile devices 16, 24 may also generate audio data or image data associated with a vehicle 14, 22 operated by another individual registered for the service and transmit the audio data or image data to the monitoring system 12. For example, the mobile devices 16, 24 may capture audio data or image data of an individual's vehicle 14, 22 relevant to the individual's operation of the vehicle 14, 22. For example, the individual operating the vehicle 14 may begin to reverse the vehicle 14 out of a driveway. As the individual continues to reverse the vehicle 14 out of the driveway, another vehicle may pass behind the vehicle 14 and cause the individual to abruptly apply the brakes to stop the vehicle 14. If a mobile device 24 associated with another individual registered for the service is within an environment of the vehicle 14 (e.g., within a particular radius of the vehicle 14), the monitoring system 12 may transmit a request to the mobile device 24 for any audio data, image data, or video data captured by the mobile device 24 in the environment of the vehicle 14. In this way, the monitoring system 12 may receive operational data associated with each vehicle 14, 22 from various sources for analysis to determine an individual's performance during an individual's usage of the vehicle 14, 22, as described herein.

As mentioned above, a software application may be installed on each individual's mobile device 16, 24 to receive operational data associated with the individual's usage of the vehicle 14, 22 and analyze the operational data to provide real-time feedback to the individual or notify the individual of future activities that may be performed by the individual along a particular route. As described above, the operational data may include data from a particular individual's vehicle 14 or the particular individual's mobile device 16. For example, each software application (e.g., via the mobile device 16, 24) may receive sensor data from the sensors 26, 28 that monitor various operations associated with the vehicle 14, 22 or various conditions associated with the vehicle 14, 22 via a network, the Internet, Bluetooth®, or the like.

Additionally, the software application may receive audio data or image data associated with an individual's usage of a vehicle 14, 22 from the mobile device 16, 24. For example, the software application may receive audio data or image data associated with usage of one or more components of the vehicle 14, 22 by the individual or driving the vehicle 14, 22 itself. Additionally, the image data may also include one or more images or one or more videos of the individual. Further, the software application may receive accelerometer data, GPS data, gyroscope data, or the like, or a combination thereof, from the mobile device 16, 24. For example, the software application determines than a vehicle is swerving based on the accelerometer data, GPS data, gyroscope data, or a combination thereof. The software application may also receive data indicative of an individual's interaction with a display device of the vehicle 14 or the display of the mobile device 16. That is, the software application may be able to determine that the individual is driving the vehicle 14 or is just a passenger based on the individual's interaction with the display device of the vehicle 14 or the display of the mobile device 16. For example, a driver may interact with a display device with one hand or one or more fingers on one hand while a passenger may interact with the display device with two hands or one or more fingers on each hand.

In certain embodiments, the software application (e.g., via the mobile device 16) may receive data associated with one or more other vehicles 22 in an environment of the vehicle 14 or one or more other individuals' mobile devices 24 in the environment of the vehicle 14. As described above, the monitoring system 12 may receive data from one or more vehicles 14, 22 operated by respective individuals registered for one or more services provided by the monitoring system 12 or one or more mobile devices 16, 24 associated with the respective individuals. After receiving the data from vehicles 14, 22, the mobile devices 16, 24, or both, the monitoring system 12 may store the data in one or more databases 30. For example, the monitoring system 12 may index the data in the databases 30 based on the individuals, the types of activities performed by one or more of the individuals while using a vehicle 14, 22, the vehicles operated by one or more of the individuals, types of vehicles 14, 22 operated by one or more of the individuals, routes travelled by one or more of the individuals, types of traffic conditions experienced by one or more of the individuals, types of weather conditions experienced by one or more of the individuals, types of road conditions experienced by one or more of the individuals, or the like. The software application may transmit a request for data associated with a particular vehicle 14, a particular individual, or the like, to the monitoring system 12 and receive data associated with the particular vehicle 14, the particular individual, or the like, from the monitoring system 12. For example, such data may have originally been transmitted to the monitoring system 12 by one or more other vehicles 22 or one or more other mobile devices 24. In this way, the software application may poll other vehicles 22 or other mobile devices 24 in an environment of a vehicle 14 for additional operational data associated with the vehicle 14 determine whether the individual is actually driving the vehicle 14 erratically or the individual is performing good avoidance driving.

Further, the software application (e.g., via the mobile device 16, 24) may also receive data associated with the individual or the vehicle 14, 22 operated by the individual from one or more other resources (e.g., the databases 30). For example, the other resources may include a travel itinerary associated with the individual, one or more electronic news sources, social media associated with the individual, or other electronic information that may be accessible via a network, the Internet, or the like. For instance, the travel itinerary may include information regarding a departure of the individual, one or more destinations that the individual may be travelling to using the vehicle 14, 22, route information between the departure location and the destinations, or the like. The software application may acquire the travel itinerary by mining data sources associated with the individual's mobile device 16, 24, such as emails, text messages, map software, travel websites, and the like.

Additionally, the electronic news sources may include various news services that may be updated in real time or near real time via a network, such as the Internet. The electronic news sources may provide information regarding traffic, construction, weather conditions, road closures, road conditions, or the like in the environment of the vehicle 14, 22 and/or along a route the individual plans to travel using the vehicle 14, 22. The software application may acquire the information by mining databases associated with the electronic news sources, frequently visited webpages by the individual, recently visited webpages by the individual, saved webpages by the individual, favorited webpages by the individual, or the like.

Further, the social media may include data available via various social media sites associated with the individual operating the vehicle 14, 22. For example, the data may include data (e.g., a geotag or location text) associated with a location of the individual or a destination of the individual. The software application may receive geolocation tags, location metadata, and the like, associated with posts on social media by the individual or images and/or video uploaded to social media by the individual. The social media may also include data trending on social media sites that may not be directly associated with the individual. For example, the trending data may include weather conditions, traffic, event information, or the like, associated with a departure location or a destination of the individual. The software application may acquire such data by mining databases or webpages associated with the social media.

Accordingly, as used herein, the "operational data" associated with an individual's usage of a vehicle 14 may include data received from the vehicle 14, data received from one or more other vehicles 22 in an environment of the vehicle 14, the individual's mobile device 16, one or more other individuals' mobile devices 24 within the environment of the vehicle 14, the databases 30, or the like. As mentioned above, after receiving the operational data, the software application may analyze the operational data to provide real-time feedback to the individual operating the vehicle 14. For example, the software application may provide the feedback to the individual via the individual's mobile device 16, a display device of the vehicle 14, a speaker of the vehicle 14, or the like. For instance, the mobile device 16 or the display device of the vehicle 14 may display a notification comprising the feedback to the individual, the mobile device 16 or the speaker of the vehicle 14 may play an auditory message or sound indicative of the feedback, or a combination thereof. Although embodiments described herein refer to the software application executing on the individual's mobile device 14 with respect to the individual's usage of the vehicle 14, it should be understood that the software application may be installed on any mobile device 24 of the individuals that have registered for one or more services provided by the monitoring system 12.

As mentioned above, after receiving the operational data associated with an individual's usage of the vehicle 14, the software application may analyze the operational data to determine whether the individual has successfully performed one or more activities associated with usage of the vehicle 14. For example, the software application may identify one or more activities that the individual may perform while operating the vehicle 14 along a particular route. In certain embodiments, the software application may compare the operational data to a list of activities associated with using a vehicle 14. The list of activities may include one or more safety tasks, such as using a seatbelt, turn signals, an emergency brake, windshield wipers, or the like, or one or more driving maneuvers, such as merging onto a highway, traversing a roundabout, stopping at a stop sign or a traffic light, yielding to appropriate traffic at a yield sign, back angle parking, parallel parking, perpendicular parking, or the like.

The software application may determine that a particular activity of the list of activities has been completed by the individual with respect to the vehicle 14 by comparing the operational data to a corresponding set of parameters associated with the particular activity. For example, a set of parameters associated with a particular activity may include a range of acceleration values associated with the vehicle 14, a range of deceleration values associated with the vehicle 14, a range of speed values associated with the vehicle 14, a range of pitch values associated with the vehicle 14, a range of roll values associated with the vehicle 14, a range of turning angles associated with the vehicle 14, a range of time periods associated with signaling usage, a range of time periods associated with headlight usage, a range of time periods associated with windshield wiper usage, seatbelt usage, one or more locations associated with the vehicle 14, or the like, or a combination thereof. If one or more values of the operational data match the corresponding set of parameters for a particular activity, the software application may determine that the particular activity has been completed by the individual. Alternatively, if the one or more values of the operational data do not match the corresponding set of parameters for the particular activity, the software application may determine that the particular activity has not been completed by the individual.

If the software application determines that the operational data satisfies the corresponding set of parameters for a particular activity, the software application may transmit a command to the vehicle 14 and/or the mobile device 16 to provide an indication that the individual has performed the activity. Alternatively, if the software application determines that the operational data does not satisfy a corresponding set of parameters for a particular activity, the software application may transmit a command to the vehicle 14 and/or the mobile device 16 to provide an indication that the individual has not performed the activity. As mentioned above, the software application may provide the indication to the individual via the individual's mobile device 16, a display device of the vehicle 14, a speaker of the vehicle 14, or the like. For instance, the mobile device 16 or the display device of the vehicle 14 may display a notification comprising the feedback to the individual, the mobile device 16 or the speaker of the vehicle 14 may play an auditory message or sound indicative of the feedback, or a combination thereof.

Additionally, or alternatively, the software application may analyze the operational data and predict one or more activities that the individual may perform during the individual's use of the vehicle 14. For example, the software application may receive operational data from the vehicle 14, the mobile device 16, the resources 31, or the like, indicative of a route associated with the individual's use of the vehicle 14. The software application may predict that the individual may perform one or more activities with respect to the vehicle 14 before proceeding along the route, along the route, after arriving at the destination of the route, or a combination thereof. For example, the software application may compare the operational data to one or more sets of parameters associated with respective activities that the individual may perform before proceeding along the route, during travel along the route, or after arriving at the individual's destination. In certain embodiments, the software application may determine that the individual should perform one or more safety tasks, one or more driving maneuvers, or the like, based on the operational data. For example, the software application may determine that the individual should put on a seatbelt, stop at a traffic light, merge onto a highway, traverse a roundabout, or the like. Additionally, the software application may determine an expected time that the individual would be expected to perform the activities before proceeding along the route, along the route, after arriving at the destination of the route, or a combination thereof.

After predicting one or more activities that the individual may perform during the individual's use of the vehicle 14, the software application may prompt the individual to perform the activities at a suitable time. For example, the software application may send a command to the vehicle 14 or the mobile device 16 to provide an indication that the individual should perform a particular activity. In certain embodiments, the software application may send the command to the vehicle 14 or the mobile device 16 to provide the indication a suitable time before the expected time that the individual would be expected to perform the activity. For example, the software application may send the command to the vehicle 14 or the mobile device 16 five seconds before, ten seconds before, fifteen seconds before, twenty seconds before, thirty seconds before, or any other suitable time before, the expected time that the individual would be expected to perform the activity. Additionally, in certain embodiments, the software application may prompt the individual to perform one or more of a set of predicted activities. Further, in certain embodiments, the software application may randomly prompt the individual to perform one or more of a set of predicted activities. In this way, the software application may encourage the individual to stay alert and focused during the individual's use of the vehicle as the individual would not know when to expect a prompt from the software application to perform a particular activity.

The software application may receive additional operational data after prompting the individual to perform the particular activity to determine whether the individual performed the particular activity. In certain embodiments, the software application may receive additional operational data after the software application has transmitted the command to the vehicle 14, the mobile device 16, or both, to provide an indication that the individual should perform the activity. For example, the software application may receive the additional operational data immediately after the software application has prompted the individual to perform the activity, during a period of time in which the individual would be expected to perform the activity (e.g., the expected time), or the like. As described above, the software application may determine that the activity has been completed by the individual by comparing the additional operational data to a corresponding set of parameters associated with the activity. If the software application determines that the individual has completed the activity, the software application may determine a performance rating associated with the individual's performance of the activity.

The performance rating may be based on a comparison between the additional operational data and a predetermined, optimal range of values for the corresponding set of parameters associated with the activity, or the like. For instance, if a time of completion of the activity is above a threshold quantity of time, the software application may determine a lower performance rating for the individual's completion of the activity. Alternatively, if the time of completion of the activity is closer to a threshold quantity of time or less than a threshold quantity of time, the software application may determine a higher performance rating for the individual's completion of the activity. If the individual completed the particular activity during a suitable time period (e.g., putting on a seatbelt before the individual moves the vehicle 14 or merging onto a highway during a particular time period along the route), the software application may determine a higher performance rating of the individual's completion of the activity. If the individual did not complete the particular activity during the suitable time period, the software application may determine a lower performance rating of the individual's completion of the activity. If a value of a pitch associated with the vehicle, a value of a yaw associated with the vehicle, a value of a roll associated with the vehicle, a value of a speed associated with the vehicle, or the like, did not fall within a corresponding range of values for the parameter associated with the activity, the software application may determine a lower performance rating of the individual's completion of the activity. Alternatively, if values of such parameters fall within the corresponding range of values for such parameters associated with the activity, the software application may determine a higher performance rating of the individual's completion of the activity.

Additionally, the software application may provide constructive feedback to the individual based on the determined performance rating of the individual's completion of the activity. For instance, the software application may compare the determine performance rating to a list or an index of suggested improvements associated with the activity. In particular, the list or the index may include various improvements to suggest to the individual based on the performance rating determined for the individual's completion of the activity. For example, if the performance rating is lower (e.g., "low", "3/10", or the like), the list or the index may include a greater number of possible suggestions to provide to the individual as compared to a performance rating that is higher (e.g., "medium", "high", "5/10", "8/10", or the like). The software application may then identify one or more suggestions from the list or the index to provide to the individual based on the performance rating. In certain embodiments, the software application may then send a command to the vehicle 14 or the mobile device 16 to provide an indication of the performance rating of the activity and/or the identified suggestions for improvement. Additionally, or alternatively, the software application may log the performance rating and the improvement suggestions in the software application for subsequent review by the individual.

In certain embodiments, the software application may reduce a number of identified improvement suggestions to provide to the individual before providing an indication of the improved suggestions via the vehicle 14 or the mobile device 16. For example, one or more of the identified suggestions may correspond to respective actions that the individual has already performed during completion of the activity. The software application may identify actions that the individual performed during completion of the activity and remove respective suggestions from being provided to the individual. In this way, the software application may limit a quantity of information provided to the individual and/or increase a quantity of relevant information that may contribute to improvement of the individual's performance of the activity.

As illustrated in FIG. 1, the monitoring system 12 may also be communicatively coupled to an individual's mobile device 16, 24 (e.g., a user's mobile device), a VR/AR/MR system 18, or another computing device 20. The monitoring system 12 may provide an educational platform or a gaming platform via the user's mobile device 16, 22, the VR/AR/MR system 18, or the computing device 20. As mentioned above, after receiving data (e.g., operational data) from the vehicles 14, 22, the mobile devices 16, 24, or both, the monitoring system 12 may store the data in one or more databases 30. For example, the monitoring system 12 may index the data in the databases 30 based on the individuals, the types of activities performed by one or more of the individuals while using a vehicle 14, 22, the vehicles operated by one or more of the individuals, types of vehicles 14, 22 operated by one or more of the individuals, routes travelled by one or more of the individuals, types of traffic conditions experienced by one or more of the individuals, types of weather conditions experienced by one or more of the individuals, types of road conditions experienced by one or more of the individuals, or the like. The user's mobile device 16, 24, the VR/AR/MR system 18, or the computing device 20 may provide the educational platform or the gaming platform to a user based on operational data received from the databases 30 via the monitoring system 12.

For example, the educational platform may provide one or more simulated driving experiences to a user based on the operational data. In certain embodiments, the user may interact with the user's mobile device 16, 24, the VR/AR/MR system 18, or the computing device 20 to select a particular simulated driving experience. For instance, the educational platform may provide the user with various selectable options to customize the user's simulated driving experience. In certain embodiments, the selectable options may include a particular type of vehicle to operate during the simulated driving experience, a particular route to traverse during the simulated driving experience, particular weather conditions to experience during the simulated driving experience, particular road conditions to experience during the simulated driving experience, particular traffic conditions to experience during the simulated driving experience, particular activities to perform during the simulated driving experiences, or the like.

After receiving an indication of the selected options associated with the user's simulated driving experience, the user's mobile device 16, the VR/AR/MR system 18, or the computing device 20 may transmit a request to the monitoring system 12 for operational data associated with the selected options. The monitoring system 12 may then transmit the operational data associated with the selected options from the databases 30 to the user's mobile device 16, the VR/AR/MR system 18, or the computing device 20. After receiving the operational data from the monitoring system 12, the user's mobile device 16, the VR/AR/MR system 18, or the computing device 20 may generate the user's simulated driving experience and provide the simulated driving experience to the user via a corresponding display device. For example, the user's mobile device 16, the VR/AR/MR system 18, or the computing device 20 may generate one or more VR/AR/MR objects, one or more VR/AR/MR environments, or the like, based on the received operational data to include in the user's simulated driving experience. In particular, the VR/AR/MR objects and/or the VR/AR/MR environments may emulate real-life objects (e.g., vehicles, roadways, street signs, traffic lights, or the like) and real-life environments (e.g., a portion of a route, weather conditions, traffic conditions, road conditions, or the like). In this way, the user's simulated driving experiences may emulate real-life experiences based on the operational data associated with the real-life driving experiences.

In certain embodiments, the monitoring system 12 may generate the VR/AR/MR objects, the VR/MR/AR environments, or the like, based on the operational data stored in the databases 30. For example, the VR/AR/MR objects and/or the VR/AR/MR environments may be indexed in the databases 30 based on operational data used to generate the VR/AR/MR objects and/or the VR/AR/MR environments. In such embodiments, the user's mobile device 16, the VR/AR/MR system 18, or the computing device 20 may transmit a request to the monitoring system 12 for one or more of the generated VR/AR/MR objects and/or one or more of the VR/AR/MR environments. After receiving the VR/AR/MR objects and/or the VR/AR/MR environments from the monitoring system 12, the user's mobile device 16, the VR/AR/MR system 18, or the computing device 20 may provide the simulated driving experience with the VR/AR/MR objects and/or the VR/AR/MR environments to the user.

During the simulated driving experience, the user may practice one or more activities with respect to a vehicle. For example, the user may practice one or more safety tasks, such as using a seatbelt, turn signals, an emergency brake, windshield wipers, or the like, or one or more driving maneuvers, such as merging onto a highway, traversing a roundabout, stopping at a stop sign or a traffic light, yielding to appropriate traffic at a yield sign, back angle parking, parallel parking, perpendicular parking, or the like. In certain embodiments, the user may practice such techniques using one or more input sources associated with the user's mobile device 16, 24, the VR/AR/MR system 18, or the computing device 20. For instance, the user may interact with the user's mobile device 16, 24 via one or more hard buttons, one or more touch interactions with a display device of the mobile device 16, 24, one or more voice commands, one or more gestures detected by a camera of the mobile device 16, 24, or the like. The user may also interact with the VR/AR/MR system 18 or the computing device 20 via one or more input devices, such as a joystick, a steering wheel, a braking controller, an acceleration controller, or the like.

Based on the user's performance of the activities during the simulated driving experience, the user's mobile device 16, 24, the VR/AR/MR system 18, or the computing device 20 may provide constructive feedback to the user that may help the user improve upon the user's performance of the activities. In certain embodiments, the user's mobile device 16, 24, the VR/AR/MR system 18, or the computing device 20 may monitor user data associated with the user's performance of the activities. For example, the user data may include user input data associated with an acceleration of the vehicle during the simulated driving experience, braking or a deceleration of the vehicle during the simulated driving experience, a speed of the vehicle during the simulated driving experience, swerving of the vehicle (e.g., a pitch of the vehicle, a roll of the vehicle, and/or a yaw of the vehicle) during the simulated driving experience, a location of the vehicle during the simulated driving experience, a turning of the vehicle during the simulated driving experience, signaling usage during the simulated driving experience, headlight usage during the simulated driving experience, windshield wiper usage during the simulated driving experience, emergency brake usage during the simulated driving experience, radio usage during the simulated driving experience, seatbelt usage during the simulated driving experience, or the like. Additionally, the user data may include user data indicative of one or more actions performed by the user during the simulated driving experience.

As the user performs one or more activities during the simulated driving experience, the user's mobile device 16, 24, the VR/AR/MR system 18, or the computing device 20 may determine a performance rating associated with the user's performance of each activity and provide constructive feedback to the user based on the determined performance rating. For example, the performance rating may be based on a comparison between the user data associated with the user's performance of an activity and a predetermined, optimal range of values for a corresponding set of parameters associated with the activity. Based on the determined performance rating associated with the user's performance of an activity, the user's mobile device 16, 24, the VR/AR/MR system 18, or the computing device 20 may provide constructive feedback to the user. For instance, the mobile device 16, 24, the VR/AR/MR system 18, or the computing device 20 may compare the performance rating to a list or an index of suggested improvements associated with the activity and identify one or more suggestions to provide to the individual based on a match between the performance rating and the suggestions. The mobile device 16, 24, the VR/AR/MR system 18, or the computing device 20 may then provide an indication of the performance rating and/or identified suggestions to the individual. Additionally, or alternatively, the mobile device 16, 24, the VR/AR/MR system 18, or the computing device 20 may log the performance rating and the identified suggestions for subsequent review by the individual.

In some embodiments, the user's mobile device 16, 24 may store a set of operational data associated with one or more of the user's real-life driving experiences on the user's mobile device 16, 24. In such embodiments, the user's mobile device 16, 24 may provide the educational platform to the user based on the operational data stored in the user's mobile device 16, 24 and additional operational data received from the databases 30 via the monitoring system 12. In this way, the user may be able to simulate past driving experiences of the user and practice certain activities the user had performed during the past driving experiences.

Additionally, or alternatively, the user's mobile device 16, 24, the VR/AR/MR system 18, or the computing device 20 may provide a gaming platform to the user based on operational data received from the databases 30 via the monitoring system 12. For instance, the gaming platform may provide a narrative such that the user may embody a role of a character within the narrative. The user may participate in various experiences through the game, which include operating a vehicle. Through the gaming platform, the user may be incentivized to perform various driving techniques to earn rewards or to complete levels within the game. Based in part on the user's performance in operating the vehicle, the user may progress through the game.

For example, as described above with respect to the educational platform, the user may perform one or more activities with respect to a vehicle. The user may perform one or more safety tasks, such as using a seatbelt, turn signals, an emergency brake, windshield wipers, or the like, or one or more driving maneuvers, such as merging onto a highway, traversing a roundabout, stopping at a stop sign or a traffic light, yielding to appropriate traffic at a yield sign, back angle parking, parallel parking, perpendicular parking, or the like. Based on the user's performance of the activities within the game, the user's mobile device 16, 24, the VR/AR/MR system 18, or the computing device 20 may determine a performance rating associated with the user's performance of each activity. For example, the performance rating may be based on a comparison between user data associated with the user's performance of an activity and a predetermined, optimal range of values for a corresponding set of parameters associated with the activity. Based on the determined performance rating associated with the user's performance of an activity, the user's mobile device 16, 24, the VR/AR/MR system 18, or the computing device 20 may determine whether the user has completed one or more goals associated with performance of the activity. For example, completion of a goal may cause the user to progress to a next level of the game or earn one or more in-game rewards (e.g., in-game items, such as a new vehicle, a new character skin, experience, currency, discounts for in-game microtransactions, or the like).

In certain embodiments, the user's performance of one or more activities within the game with respect to operating the vehicle may earn the user one or more types of rewards that may be used outside the game. As described above, the user's mobile device 16, 24, the VR/AR/MR system 18, or the computing device 20 may determine a performance rating associated with the user's performance of an activity. Based on the performance rating, the user may be allocated a quantity of points, credit, money, or the like, that the user may use outside the game. For example, an enterprise associated with the monitoring system 12 may allocate the reward to a profile associated with the user. The user may then redeem the reward using the user's mobile device 16, 24, a financial account associated with the user, an application associated with the reward, or the like.

Further, in certain embodiments, the monitoring system 12 may reward an individual's performance in using a vehicle in the real world by providing rewards to the user within a gaming platform. For example, after the software application on the individual's mobile device 16, 24 determines a performance rating of one or more activities performed by the individual during the individual's use of the vehicle, the software application may transmit data indicative of the performance rating to the monitoring system 12. The monitoring system 12 may then determine one or more corresponding rewards (e.g., in-game items, such as a new vehicle, a new character skin, experience, currency, discounts for in-game microtransactions, or the like) to allocate to the individual based on the individual's performance rating. For instance, if a gaming platform includes aspects related to driving or racing vehicles, the reward may include a higher quality vehicle, a higher quality part of a vehicle, an allocation of points that the user may use to obtain various items, or the like. In this way, the monitoring system 12 may provide an incentive-based system to promote improved performance in an individual's use of the vehicle in the real-world.

Figure 2:
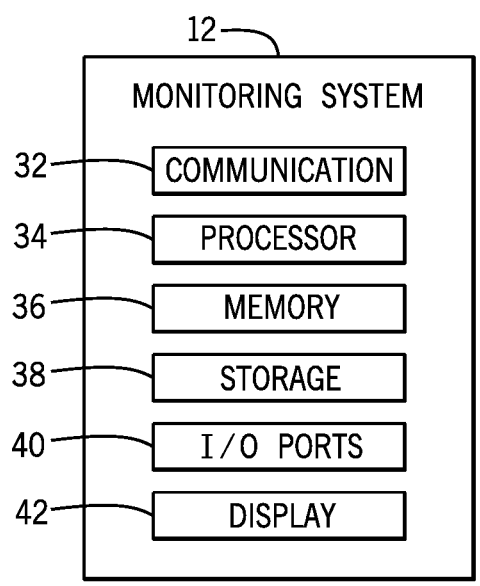
FIG. 2 illustrates a block diagram of a monitoring system employed by the system of FIG. 1, in accordance with embodiments described herein.

To perform some of the actions set forth above, the monitoring system 12 may include certain embodiments to facilitate these actions. FIG. 2 is a block diagram of example components within the monitoring system 12. For example, the monitoring system 12 may include a communication component 32, a processor 34, a memory 36, a storage 38, input/output (I/O) ports 40, a display 42, and the like. The communication component 32 may be a wireless or wired communication component that may facilitate communication between the monitoring system 12, the vehicles 14, 22, the mobile devices 16, 24, the VR/AR/MR system 18, the computing device 20, the databases 30, and the like. Additionally, the communication component 32 may facilitate data transfer to the monitoring system 12, such that the monitoring system 12 may receive operational data from the vehicles 14, 22 and the mobile devices 16, 24 and the like.

The processor 34 may be any type of computer processor or microprocessor capable of executing computer-executable code. The processor 34 may also include multiple processors that may perform the operations described below. In addition, the memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store data, consumer models, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, I/O modules, and the like. The display 42 may operate to depict visualizations associated with software or executable code being processed by the processor 34. In one embodiment, the display 42 may be a touch display capable of receiving inputs from a user of the monitoring system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the monitoring system 12.

It should be noted that the components described above with regard to the monitoring system 12 are exemplary components and the monitoring system 12 may include additional or fewer components as shown. Additionally, it should be noted that the mobile devices 16, 24 and the computing device 20 may also include similar components as described as part of the monitoring system 12.

Figure 3:
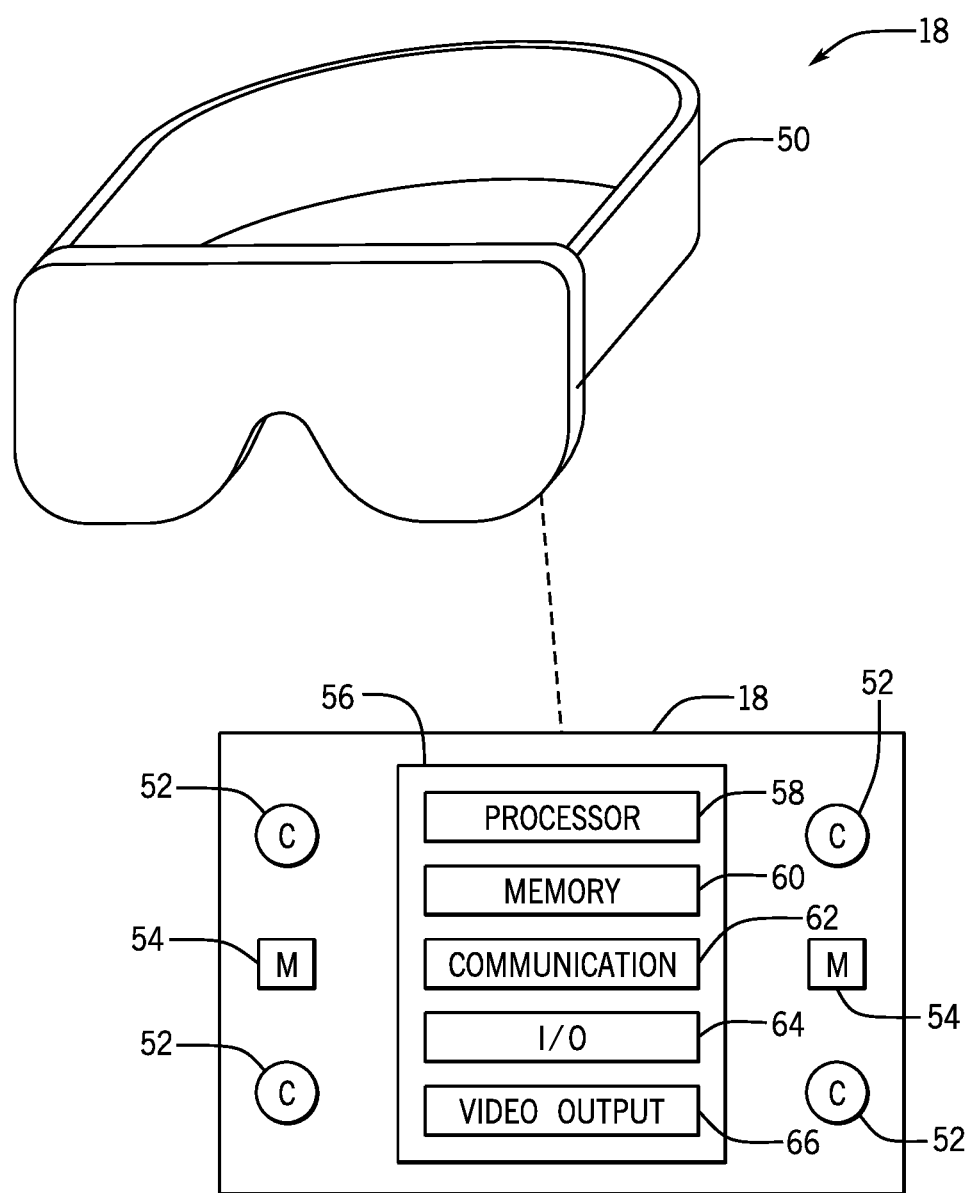
FIG. 3 illustrates a block diagram of a virtual reality, augmented reality, or mixed reality (VR/AR/MR) system employed by the system of FIG. 1, in accordance with embodiments described herein.

To perform some of the actions set forth above, the VR/AR/MR system 18 may include certain components to facilitate these actions. FIG. 3 is a block diagram of exemplary components within the VR/AR/MR system 18. For example, VR/AR/MR system 18 may include a head mounted device 50. However, it should be understood that, in other embodiments, the VR/AR/MR system 18 may include any other suitable display device for providing the simulated driving experiences, the educational platform, the gaming platform, or the like.

The VR/AR/MR system 18 may include one or more cameras 52 and one or more microphones 54. It should be understood that any suitable image-receiving device may be used in place of, or in addition to, the cameras 52. For example, a singular camera 52 may be incorporated into the VR/AR/MR system 18. It also should be understood that any suitable sound-receiving device may be used in place of, or in addition to, the microphones 54, for example, a combined speaker and microphone device, or a singular microphone 54 may be incorporated into the VR/AR/MR system 18.

In some embodiments, the VR/AR/MR system 18 may include one or more sensors for detecting the movements of a user of the VR/AR/MR system 18, biometrics of the user, the surroundings of the user, or the like. For example, the VR/AR/MR system 18 may include an infrared sensor, a thermal sensor, a range sensor (e.g., a range camera), a smell sensor (e.g., an electronic nose), or any other suitable sensors for detecting characteristics of the user or the surroundings of the user.

The VR/AR/MR system 18 may also include processing circuitry 56 including a processor 58, a memory 60, a communication component 62, input/output (I/O) ports 64, and the like. The communication component 62 may be a wireless or a wired communication component that may facilitate communication between the VR/AR/MR system 18, the monitoring system 12, and the like via a network. The wired or wireless communication protocols may include any suitable communication protocol include Wi-Fi, mobile telecommunications technology (e.g., 2G, 3G, 4G, LTE), Bluetooth®, near-field communications technology, and the like.

The processor 58 of the VR/AR/MR system 18 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 58 may, in some embodiments, include multiple processors. The memory 60 may include any suitable articles of manufacture that serve as media to store processor-executable code, data, and the like. The memory 60 may store non-transitory processor-executable code used by the processor 58 to perform the presently disclosed techniques.

Generally, the VR/AR/MR system 18 may receive image data or audio data related to a user via one or more image sensors (e.g., cameras 52) or one or more audio sensors (e.g., microphones 54), respectively, communicatively coupled to one or more of the I/O ports 64. Upon receiving image data or audio data, the VR/AR/MR system 18, via the processor 58, may interpret the image data or the audio data to determine commands or actions for the VR/AR/MR system 18 to perform in response to the determined commands or actions. For example, the commands or the actions may include a gesture command or a verbal command, respectively, stored, learned or otherwise interpretable by the VR/AR/MR system 18. For instance, the VR/AR/MR system 18 may identify a gesture command based on a user movement in the image data, such as a motion of the user's hands, wrists, arms, fingers, or any other suitable body part to distinguish one gesture command from another gesture command.

Additionally, the VR/AR/MR system 18 may analyze characteristics of the audio data, such as frequency (e.g., pitch), amplitude (e.g., loudness), or any other suitable characteristic used to distinguish one verbal command from another verbal command. If a threshold of one or more characteristics for a gesture command or a verbal command match a stored, learned, or otherwise interpretable command, the VR/AR/MR system 18 may determine a command to be performed by the VR/AR/MR system 18 based on the image data or the audio data.

The VR/AR/MR system 18 may also include a video output 66. The video output 66 may be any suitable image-transmitting component, such as a display. The VR/AR/MR system may display a visualization associated with a VR/AR/MR environment that combines computer-generated content, such as the VR/AR/MR objects and/or the VR/AR/MR environments, with real-world content, such as image data associated with the user and/or the user's physical surroundings.

Figure 4:
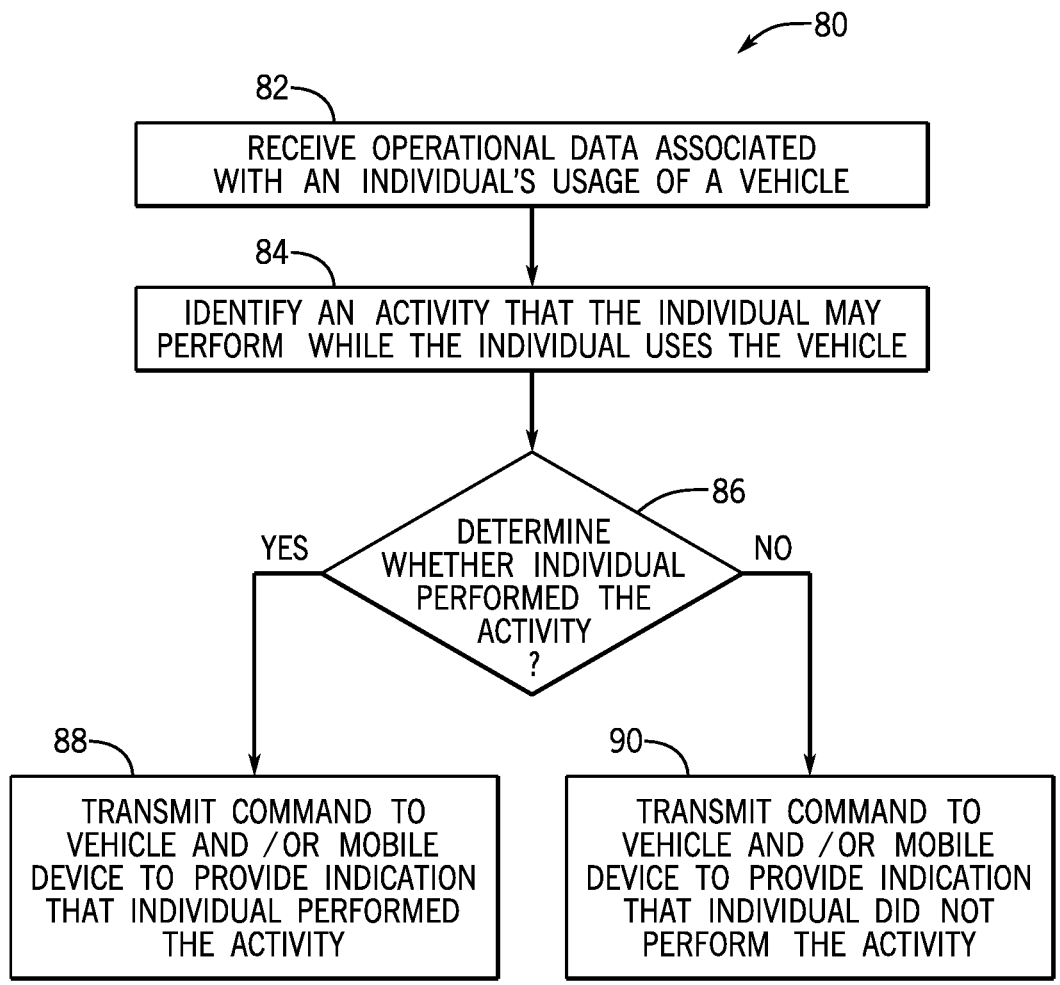
FIG. 4 illustrates a flow chart of a method for analyzing operational data associated with an individual's usage of a vehicle and determining whether the individual has successfully performed one or more activities associated with the individual's usage of the vehicle, in accordance with embodiments described herein.

With the foregoing in mind, FIG. 4 illustrates a flow chart of a method 80 for analyzing operational data associated with an individual's usage of a vehicle 14, 22 and determining whether the individual has successfully performed one or more activities associated with the individual's usage of the vehicle 14, 22. Although the following description of the method 80 is described in a particular order, it should be noted that the method 80 is not limited to the depicted order, and instead, the method 80 may be performed in any suitable order. Moreover, although the method 80 is described as being performed by a software application executing on the individual's mobile device 16, 24, it should be noted that it may be performed by any suitable computing device.

Referring now to FIG. 4, at block 82, a software application executing on an individual's mobile device 16 may receive operational data associated with the individual's usage of a vehicle 14. As described above, the operational data may include data from the individual's vehicle 14 or the individual's mobile device 16. For example, the software application (e.g., via the mobile device 16) may receive sensor data from sensors that monitor various operations associated with the vehicle 14 or various conditions associated with the vehicle 14. Additionally, the operational data may include audio data or image data associated with the individual's usage of the vehicle 14 from the mobile device 16. For example, the software application may receive audio data or image data associated with the individual's usage of one or more components of the vehicle 14 or the individual's driving of the vehicle 14 itself. Additionally, the image data may also include one or more images or one or more videos of the individual or a body part thereof.

In certain embodiments, the operational data may include data from one or more other vehicles 22 in an environment of the vehicle 14 or one or more other mobile devices 24 in the environment of the vehicle. For example, the software application may transmit a request for additional data associated with the vehicle 14, the individual, or the like, to the monitoring system 12. The monitoring system 12 may transmit stored data to other vehicles 22 in the environment of the vehicle 14 or mobile devices 24 in the environment of the vehicle 14. The operational data may also include data associated with the individual or the vehicle 14 from one or more other resources (e.g., databases 30). For example, the resources may include a travel itinerary associated with the individual, one or more electronic news sources, social media associated with the individual, or electronic information that may be accessible by the user's mobile device 16.

After receiving the operational data associated with the individual's usage of the vehicle 14, at block 82, the software application may identify one or more activities that the individual may perform while the individual uses the vehicle 14 at block 84. In certain embodiments, the software application may compare the operational data associated with the individual's usage of the vehicle 14 to a list of activities associated with using a vehicle 14. The list of activities may include one or more safety tasks, such as using a seatbelt, turn signals, an emergency brake, windshield wipers, or the like, or one or more driving maneuvers, such as merging onto a highway, traversing a roundabout, stopping at a stop sign or a traffic light, yielding to appropriate traffic at a yield sign, back angle parking, parallel parking, perpendicular parking, or the like. For example, the software application may identify one or more activities that the individual may perform from the list of activities based on a travel itinerary of the individual, based on general operation of the vehicle, based on social media of the individual, or the like.

At block 86, the software application may determine that the identified activity has been completed by the individual with respect to the vehicle 14. For example, the software application may compare the operational data to a corresponding set of parameters associated with the particular activity. For instance, a set of parameters associated with a particular activity may include a range of acceleration values associated with the vehicle 14, a range of deceleration values associated with the vehicle 14, a range of speed values associated with the vehicle 14, a range of pitch values associated with the vehicle 14, a range of roll values associated with the vehicle 14, a range of turning angles associated with the vehicle 14, a range of time periods associated with signaling usage, a range of time periods associated with headlight usage, a range of time periods associated with windshield wiper usage, seatbelt usage, one or more locations associated with the vehicle 14, or the like, or a combination thereof.

If one or more values of the operational data matches the corresponding set of parameters for a particular activity, the software application may determine that the particular activity has been completed by the individual and transmit a command to the vehicle 14 and/or the mobile device 16 to provide an indication that the individual has performed the activity at block 88. Alternatively, if the one or more values of the operational data does not match the corresponding set of parameters for the particular activity, the software application may determine that the particular activity has not been completed by the individual and transmit a command to the vehicle 14 and/or the mobile device 16 to provide an indication that the individual has not performed the activity at block 90.

Figure 5:
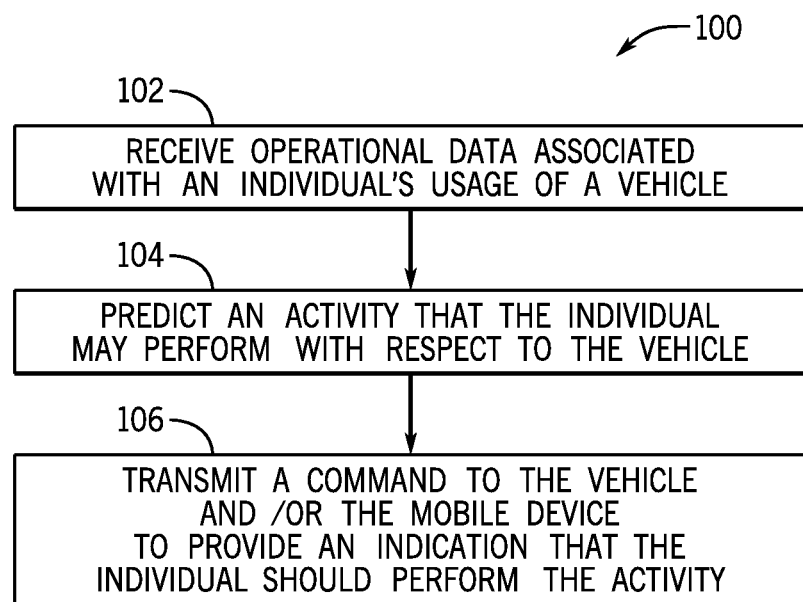
FIG. 5 illustrates a flow chart of a method for analyzing operational data associated with an individual's usage of a vehicle, predicting one or more activities that an individual may perform when using the vehicle along a particular route, and prompting the individual to perform the activities at a suitable time, in accordance with embodiments described herein.

FIG. 5 illustrates a flow chart of a method 100 for analyzing operational data associated with an individual's usage of a vehicle 14, predicting one or more activities that an individual may perform when using the vehicle 14 along a particular route, and prompting the individual to perform the activities at a suitable time. Although the following description of the method 100 is described in a particular order, it should be noted that the method 100 is not limited to the depicted order, and instead, the method 100 may be performed in any suitable order. Moreover, although the method 100 is described as being performed by a software application executing on the individual's mobile device 16, 24, it should be noted that it may be performed by any suitable computing device.

Referring now to FIG. 5, at block 102, a software application executing on an individual's mobile device 16 may receive operational data associated with the individual's usage of a vehicle 14. As described above, the operational data may include data from the individual's vehicle 14, the individual's mobile device 16, one or more other vehicles 22 in an environment of the vehicle 14, one or more other mobile devices 24 in the environment of the vehicle 14, one or more other resources 30, or the like.

After receiving the operational data associated with the individual's usage of the vehicle 14, at block 102, the software application may predict that the individual may perform one or more activities with respect to the vehicle 14 at block 104. For example, the individual may be expected to perform the activities before proceeding along a route, along the route, after arriving at a destination of the route, or a combination thereof. In certain embodiments, the software application may compare the operational data to one or more sets of parameters associated with respective activities that the individual may be expected to perform before proceeding along the route, during travel along the route, or after arriving at the individual's destination. Based on the comparison, the software application may determine that the individual may be expected to perform one or more safety tasks, one or more driving maneuvers, or the like, based on the operational data. For example, the software application may determine that the individual should put on a seatbelt, stop at a traffic light, merge onto a highway, traverse a roundabout, or the like. Additionally, the software application may determine an expected time that the individual would be expected to perform the activities before proceeding along the route, along the route, after arriving at the destination of the route, or a combination thereof.

In one embodiment, the software application may predict that a turn signal should be used by the individual based on operational data associated with an individual's usage of the vehicle 14. For instance, the operational data may include GPS data, travel itinerary data, gyroscope data, or the like, or a combination thereof. The software application may compare the operational data to a list of activities to determine that the individual should perform a turn during a particular segment of the individual's route and that the individual should use a turn signal before and/or during the individual's performance of the turn. Additionally, the software application may continue to receive operational data from the vehicle 14, the mobile device 16, or the like, and determine whether the individual has used the turn signal before and/or during the individual's performance of the turn during the particular segment of the individual's route. For instance, the operational data may include audio data from a microphone associated with the mobile device 16, audio data from a microphone associated with the vehicle 14, turn signal usage data from the vehicle 14, or the like, or a combination thereof. The software application may then compare the received operational data to a set of parameters associated with turn signal usage. If the received operational data matches the set of parameters associated with turn signal usage, the software application may determine that the individual has used the turn signal. Alternatively, if the received operational data does not match the set of parameters associated with turn signal usage, the software application may determine that the individual has not used the turn signal.

In another embodiment, the software application may predict that a seatbelt should be used by the individual based on operational data associated with an individual's usage of the vehicle 14. For instance, the operational data may include audio data indicative of the individual entering the vehicle 14 or sitting in the driver's seat, data indicative of the vehicle 14 being powered on, data indicative of the engine of the vehicle 14 being started, or the like, or a combination thereof. The software application may compare the operational data to a list of activities to determine that the individual should put on a seatbelt before the individual starts moving the vehicle 14. Additionally, the software application may continue to receive operational data from the vehicle 14, the mobile device 16, or the like, and determine whether the individual has put on the individual's seatbelt before moving the vehicle 14. For instance, the operational data may include audio data from a microphone associated with the mobile device 16, audio data from a microphone associated with the vehicle 14, seatbelt usage data from the vehicle 14, or the like, or a combination thereof. The software application may then compare the received operational data to a set of parameters associated with seatbelt usage. If the received operational data matches the set of parameters associated with using the seatbelt, the software application may determine that the individual has used the seat belt. Alternatively, if the received operational data does not match the set of parameters associated with using the seat belt, the software application may determine that the individual has not used the seat belt.

After predicting one or more activities that the individual may perform during the individual's use of the vehicle 14 at block 104, the software application may prompt the individual to perform the activities at a suitable time. For example, the software application may send a command to the vehicle 14 or the mobile device 16 to provide an indication that the individual should perform a particular activity. In certain embodiments, the software application may send the command to the vehicle 14 or the mobile device 16 to provide the indication a suitable time before the expected time that the individual would be expected to perform the activity.

Figure 6:
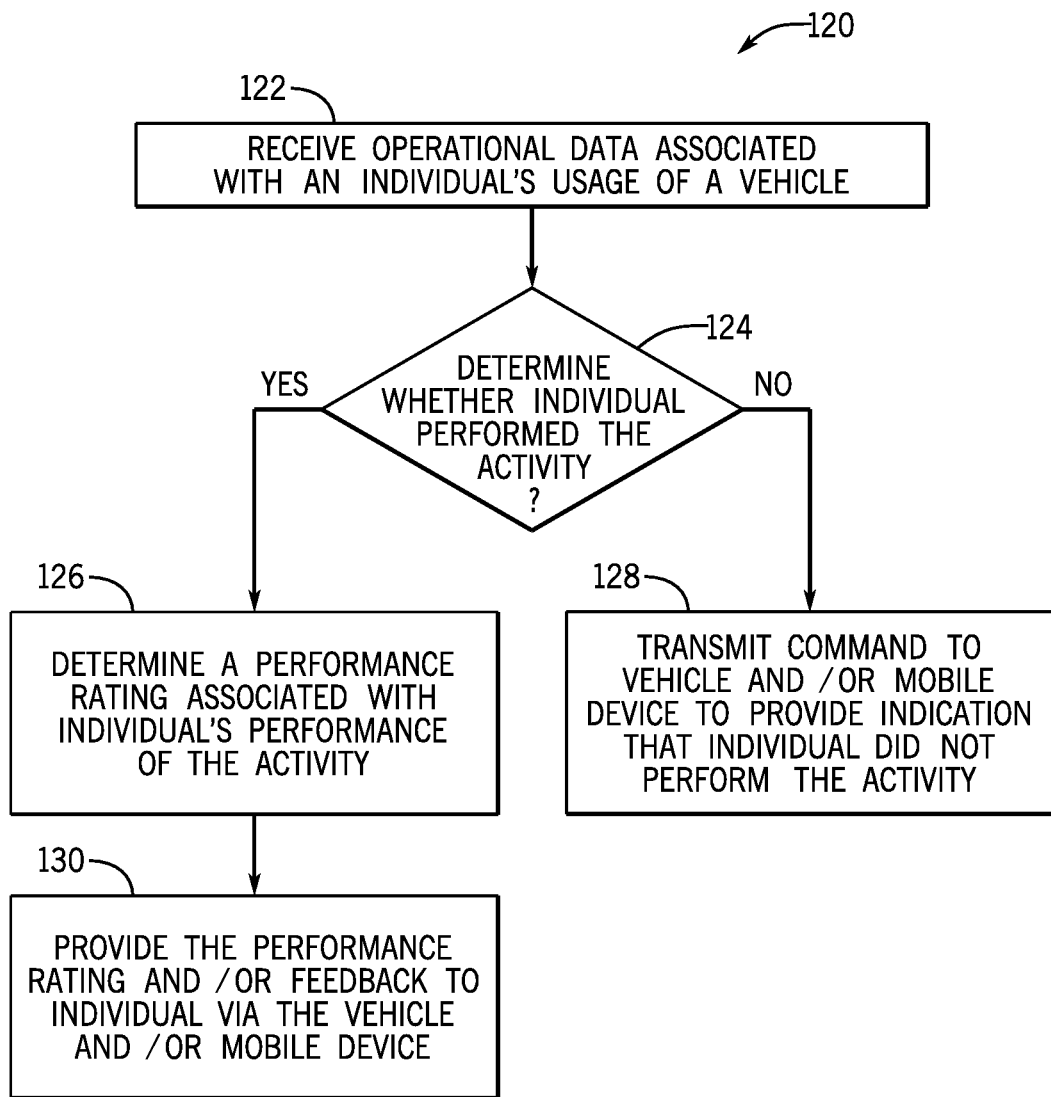
FIG. 6 illustrates a flow chart of a method for analyzing operational data associated with an individual's usage of a vehicle, determining a performance rating associated with the individual's performance of an activity, and providing feedback to the individual based on the performance rating, in accordance with embodiments described herein.

FIG. 6 illustrates a flow chart of a method 120 for analyzing operational data associated with an individual's usage of a vehicle 14, determining a performance rating associated with the individual's performance of an activity, and providing feedback to the individual based on the performance rating. Although the following description of the method 120 is described in a particular order, it should be noted that the method 120 is not limited to the depicted order, and instead, the method 120 may be performed in any suitable order. Moreover, although the method 120 is described as being performed by a software application executing on the individual's mobile device 16, 24, it should be noted that it may be performed by any suitable computing device.

Referring now to FIG. 6, at block 122, a software application executing on an individual's mobile device 16 may receive operational data associated with the individual's usage of a vehicle 14. As described above, the operational data may include data from the individual's vehicle 14, the individual's mobile device 16, one or more other vehicles 22 in an environment of the vehicle 14, one or more other mobile devices 24 in the environment of the vehicle 14, one or more other resources (e.g., databases 30), or the like. In certain embodiments, the software application may receive the operational data after prompting the individual to perform a particular activity as described above with respect to FIG. 5. For example, the software application may receive the operational data after the software application has transmitted the command to the vehicle 14, the mobile device 16, or both, to provide an indication that the individual should perform the particular activity.

After receiving the operational data associated with the individual's usage of the vehicle 14, at block 122, the software application may determine that an activity has been performed by the individual with respect to the vehicle 14 at block 124. For example, the software application may compare the operational data to a corresponding set of parameters associated with the activity. If one or more values of the operational data match the corresponding set of parameters for a particular activity, the software application may determine that the particular activity has been completed by the individual and determine a performance rating associated with the individual's performance of the activity at block 126. Alternatively, if the one or more values of the operational data does not match the corresponding set of parameters for the particular activity, the software application may determine that the particular activity has not been completed by the individual and transmit a command to the vehicle 14 and/or the mobile device 16 to provide an indication that the individual has not performed the activity at block 128.

Referring back to block 126, the software application may determine the performance rating based on a comparison between the operational data and a predetermined, optimal range of values for the corresponding set of parameters associated with the activity, or the like. For instance, if a time of completion of the activity is above a threshold quantity of time, the software application may determine a lower performance rating for the individual's completion of the activity. Alternatively, if the time of completion of the activity is closer to a threshold quantity of time or less than a threshold quantity of time, the software application may determine a higher performance rating for the individual's completion of the activity. If the individual completed the particular activity during a suitable time period (e.g., putting on a seatbelt before the individual moves the vehicle 14 or merging onto a highway during a particular time period along the route), the software application may determine a higher performance rating of the individual's completion of the activity. If the individual did not complete the particular activity during the suitable time period, the software application may determine a lower performance rating of the individual's completion of the activity. If a value of a pitch associated with the vehicle, a value of a yaw associated with the vehicle, a value of a roll associated with the vehicle, a value of a speed associated with the vehicle, or the like, did not fall within a corresponding range of values for the parameter associated with the activity, the software application may determine a lower performance rating of the individual's completion of the activity. Alternatively, if values of such parameters fall within the corresponding range of values for such parameters associated with the activity, the software application may determine a higher performance rating of the individual's completion of the activity.

After determining the performance rating associated with the individual's performance of the activity at block 126, the software application may provide constructive feedback to the individual based on the determined performance rating. For instance, the software application may compare the determine performance rating to a list or an index of suggested improvements associated with the activity. In particular, the list or the index may include various improvements to suggest to the individual based on the performance rating determined for the individual's completion of the activity. For example, if the performance rating is lower, the list or the index may include a greater number of possible suggestions to provide to the individual as compared to a performance rating that is higher. The software application may then identify one or more suggestions from the list or the index to provide to the individual based on the performance rating. In certain embodiments, the software application may then send a command to the vehicle 14 or the mobile device 16 to provide an indication of the performance rating of the activity and/or the identified suggestions for improvement. Additionally, or alternatively, the software application may log the performance rating and the improvement suggestions in the software application for subsequent review by the individual.

With the foregoing in mind, FIG. 7 illustrates a flow chart of a method 140 for providing a simulated driving experience to a user based on operational data associated with one or more real-life driving experiences and providing feedback to the user based on the user's performance of one or more activities with respect to driving a vehicle during the simulated driving experience. Although the following description of the method 140 is described in a particular order, it should be noted that the method 140 is not limited to the depicted order, and instead, the method 140 may be performed in any suitable order. Moreover, although the method 140 is described as being performed by the VR/AR/MR system 18, it should be noted that it may be performed by any suitable computing device, such as the mobile devices 16, 24 or the computing device 20.

Referring now to FIG. 7, at block 142, the VR/AR/MR system 18 may receive user input indicative of one or more customizations of a simulated driving experience. After receiving the user input indicative of the customizations of the simulated driving experience, the VR/AR/MR system 18 may transmit a request to the monitoring system 12 for operational data associated with the customizations at block 144. The monitoring system 12 may then transmit the operational data associated with the customizations from one or more databases 30 to the VR/AR/MR system 18.

After receiving the operational data from the monitoring system 12 at block 146, the VR/AR/MR system 18 may generate the user's simulated driving experience at block 148. For example, the VR/AR/MR system 18 may generate one or more VR/AR/MR objects, one or more VR/AR/MR environments, or the like, based on the received operational data to include in the user's simulated driving experience. In particular, the VR/AR/MR objects and/or the VR/AR/MR environments may emulate real-life objects (e.g., vehicles, roadways, street signs, traffic lights, or the like) and real-life environments (e.g., a portion of a route, weather conditions, traffic conditions, road conditions, or the like). In this way, the user's simulated driving experiences may emulate real-life experiences based on the operational data associated with the real-life driving experiences.

After generating the simulated driving experience at block 148, the VR/AR/MR system 18 may provide the simulated driving experience to the user via the head mounted device 50 or another suitable display device at block 150. During the simulated driving experience, the user may practice one or more activities with respect to a vehicle. For example, the user may practice one or more safety tasks, such as using a seatbelt, turn signals, an emergency brake, windshield wipers, or the like, or one or more driving maneuvers, such as merging onto a highway, traversing a roundabout, stopping at a stop sign or a traffic light, yielding to appropriate traffic at a yield sign, back angle parking, parallel parking, perpendicular parking, or the like.

As such, during the simulated driving experience, the VR/AR/MR system may monitor user data associated with the user's performance of one or more activities at block 152. The user data may include user input data associated with an acceleration of the vehicle during the simulated driving experience, braking or a deceleration of the vehicle during the simulated driving experience, a speed of the vehicle during the simulated driving experience, swerving of the vehicle (e.g., a pitch of the vehicle, a roll of the vehicle, and/or a yaw of the vehicle) during the simulated driving experience, a location of the vehicle during the simulated driving experience, a turning of the vehicle during the simulated driving experience, signaling usage during the simulated driving experience, headlight usage during the simulated driving experience, windshield wiper usage during the simulated driving experience, emergency brake usage during the simulated driving experience, radio usage during the simulated driving experience, seatbelt usage during the simulated driving experience, or the like. Additionally, the user data may include user data indicative of one or more actions performed by the user during the simulated driving experience.

Based on the user data, at block 152, the VR/AR/MR system 18 may determine and provide constructive feedback to the user that may help the user improve upon the user's performance of one or more activities associated with the user data. In certain embodiments, the VR/AR/MR system 18 may determine a performance rating associated with the user's performance of an activity based on the user data. For example, the performance rating may be based on a comparison between the user data associated with the user's performance of the activity and a predetermined, optimal range of values for a corresponding set of parameters associated with the activity. Based on the determined performance rating associated with the user's performance of an activity, the VR/AR/MR system 18 may provide constructive feedback to the user. For instance, the VR/AR/MR system 18 may compare the performance rating to a list or an index of suggested improvements associated with the activity and identify one or more suggestions to provide to the individual based on a match between the performance rating and the suggestions. The VR/AR/MR system 18 may then provide an indication of the performance rating and/or identified suggestions to the individual. Additionally, or alternatively, the VR/AR/MR system 18 may log the performance rating and the identified suggestions for subsequent review by the individual.

With the foregoing in mind, FIG. 8 illustrates a flow chart of a method 160 for rewarding an individual's performance in operating a vehicle in the real world by allocating rewards to the individual for use in a gaming platform or other software application. Although the following description of the method 160 is described in a particular order, it should be noted that the method 160 is not limited to the depicted order, and instead, the method 160 may be performed in any suitable order. Moreover, although the method 160 is described as being performed by the monitoring system 12, it should be noted that it may be performed by any suitable computing device.

Referring now to FIG. 8, at block 162, the monitoring system 12 may receive a performance rating of one or more activities performed by an individual during the individual's use of the vehicle. For example, the software application executing on the individual's mobile device 16 may determine the performance rating as described above with respect to FIG. 6. The software application may then transmit data indicative of the performance rating of the activities to the monitoring system 12.

At block 164, the monitoring system 12 may determine one or more corresponding in-game rewards (e.g., in-game items, such as a new vehicle, a new character skin, experience, currency, discounts for in-game microtransactions, or the like) to allocate to the individual for use in a gaming platform based on the individual's performance rating. In certain embodiments, the reward may include one or more pieces to a graphical puzzle, that when completed, would unlock a particular in-game item. For instance, the graphical puzzle may be represented by a graphical representation indicative of the in-game item. The graphical representation may be split into multiple puzzle pieces, which may be awarded to the user by the monitoring system 12 upon the user's completion of one or more goals. For instance, the goals may relate to improvement in the individual's performance of one or more activities with respect to usage of the vehicle 14.

In any case, after the monitoring system 12 determines an in-game reward to allocate to the individual for use in the gaming platform at block 164, the monitoring system 12 may update a user profile associated with the individual in the gaming platform such that the individual has access to the reward at block 166.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system, comprising:
 a mobile device, comprising:
  one or more processors; and
  a memory, accessible by the one or more processors, the memory storing instructions, that when executed by the one or more processors, cause the one or more processors to perform operations comprising:
   receiving operational data associated with usage of a vehicle operated by an individual, wherein the operational data comprises audio data associated with an interior environment of the vehicle;
   identifying an activity that the individual is expected to perform with respect to the usage of the vehicle operated by the individual;
   determining whether the individual performed the activity based on the operational data; and
   providing an indication that the individual performed the activity in response to determining that the individual performed the activity.

2. The system of claim 1, wherein the operational data includes data generated by the mobile device and data generated by one or more additional mobile devices within an environment of the vehicle during a time period associated with the usage of the vehicle operated by the individual.

3. The system of claim 2, comprising a monitoring system configured to receive the operational data from the mobile device and the one or more additional mobile devices, and to index the operational data in a database communicatively coupled to the monitoring system.

4. The system of claim 1, wherein the operational data includes data generated by the mobile device and data received from the vehicle.

5. The system of claim 1, wherein the operational data includes data generated by one or more additional vehicles within an environment of the vehicle during a time period associated with the usage of the vehicle operated by the individual.

6. The system of claim 1, wherein the operational data comprises global positioning system (GPS) data from the mobile device, gyroscope data from the mobile device, or both, and wherein the activity comprises a turning of the vehicle.

7. The system of claim 1, wherein the activity comprises turn signal usage.

8. A method, comprising:
 receiving, by a software application configured to execute on a mobile device associated with an individual operating a vehicle, operational data associated with operation of the vehicle, wherein the operational data comprises audio data associated with an interior environment of the vehicle;
 predicting, by the software application, one or more activities that the individual is expected to perform with respect to operation of the vehicle based at least in part on the operational data; and providing, by the software application via the mobile device, an indication of a recommendation to perform the one or more activities.

9. The method of claim 8, comprising determining, by the software application, an expected time that the individual is expected to perform the one or more activities based at least in part on the operational data.

10. The method of claim 9, wherein the software application provides the indication of the recommendation via the mobile device before the expected time.

11. The method of claim 10, comprising receiving, by the software application, additional operational data associated with operation of the vehicle operated by the individual after providing the indication of the recommendation to perform the one or more activities.

12. The method of claim 11, comprising determining, by the software application, that the individual has performed the one or more activities based at least in part on the additional operational data.

13. The method of claim 12, comprising determining, by the software application, a performance rating associated with a performance of the one or more activities by the individual based at least in part on the additional operational data.

14. The method of claim 13, comprising providing, by the software application via the mobile device, an indication of feedback to the individual based at least in part on the performance rating, wherein the feedback comprises one or more suggestions for an improvement associated with the performance of the one or more activities by the individual.

15. The method of claim 8, wherein the one or more activities comprises seatbelt usage by the individual.

\* \* \* \* \*